United States Patent [19]
Basu

[11] Patent Number: 5,506,854
[45] Date of Patent: Apr. 9, 1996

[54] INTEGRATED, INTRACAVITY, FREQUENCY-CONVERTED SLAB LASER

[75] Inventor: Santanu Basu, Rancho Palos Verdes, Calif.

[73] Assignee: Northrop Grumman Corporation, Los Angeles, Calif.

[21] Appl. No.: 422,301

[22] Filed: Apr. 10, 1995

[51] Int. Cl.$^6$ .................................................. H01S 3/04
[52] U.S. Cl. .................. 372/34; 372/66; 372/22; 372/99
[58] Field of Search .................. 372/34, 66, 22, 372/99

[56] References Cited

U.S. PATENT DOCUMENTS 4,972,426 11/1990 Steffen ........................ 372/66
5,034,953 7/1991 Sekiguchi ........................ 372/66
5,237,580 8/1993 Mefferd ........................ 372/66

OTHER PUBLICATIONS

Byer, R. L. "Diode Laser–Pumped Solid–State Lasers" Science, vol. 239 (12 Feb. 1988) pp. 742–747.

Primary Examiner—Leon Scott, Jr.
Attorney, Agent, or Firm—Terry J. Anderson; Karl J. Hoch, Jr.

[57] ABSTRACT

A very compact source of laser radiation in the visible is described which uses pulsed laser diode on which is mounted a thermal transfer block having an arm for receiving the diode, and another arm for receiving a laser cavity comprising of a slab of Nd—YVO$_4$, a second harmonic crystal such as KTP, one surface of which becomes the output coupler of the visible radiation, and one aspheric end mirror.

7 Claims, 2 Drawing Sheets

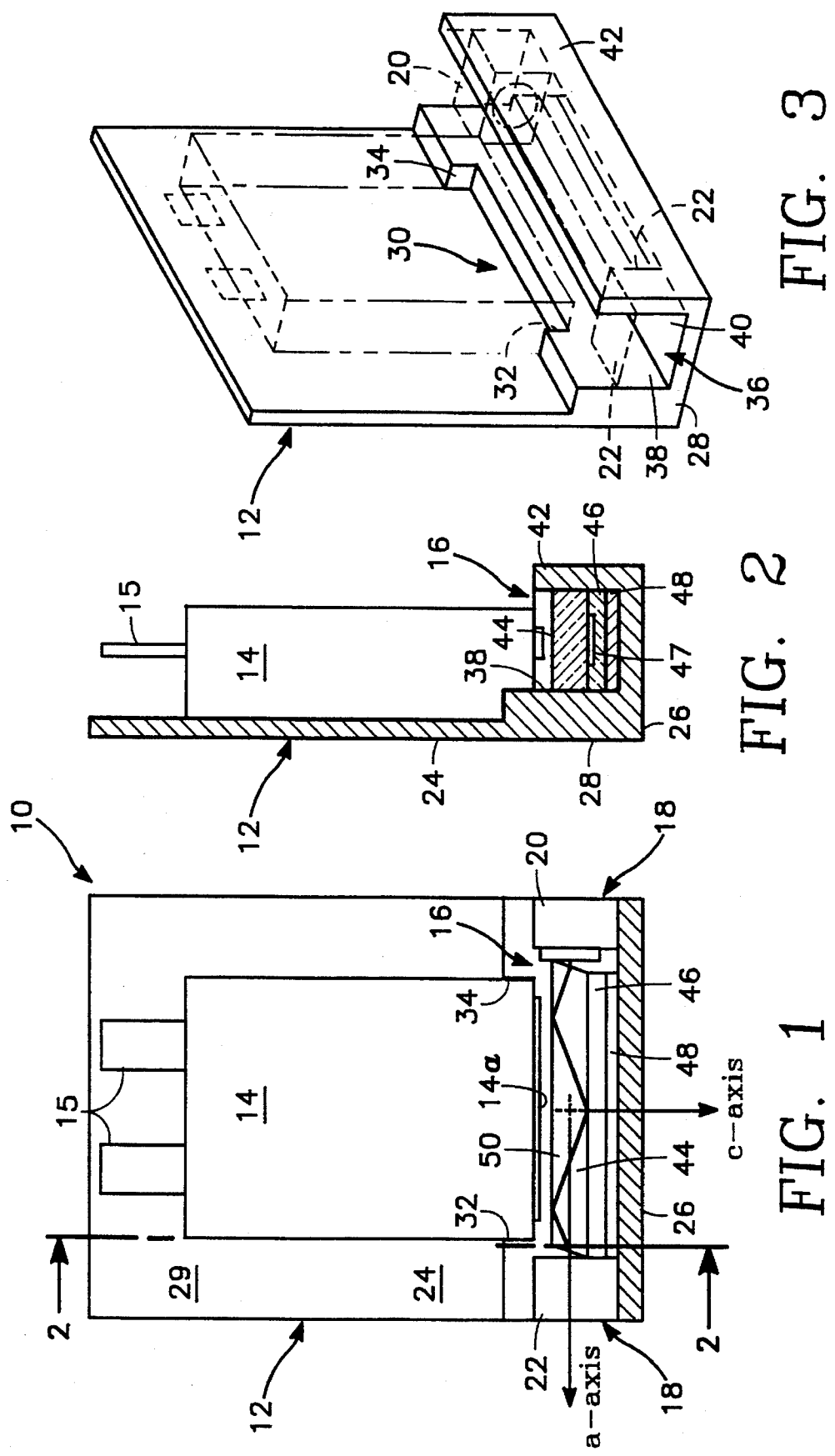

INTEGRATED, INTRACAVITY, FREQUENCY-CONVERTED SLAB LASER

CROSS REFERENCE TO RELATED APPLICATION

Cross reference is made to my copending application Ser. No. 08/418,589, filed concurrently herewith, and entitled COOLING SYSTEM AND MOUNTING FOR SLAB LASERS AND OTHER OPTICAL DEVICES, filed in the name of Santanu Basu, the content of which is incorporated herein by reference in its entirety.

1. Field of the Invention

This invention relates to compact solid-state slab lasers and, more particularly to such lasers which are of a unitary construction in a miniature package of high output in the visible, and to an intracavity, frequency-converted slab laser for such purposes.

2. Background of the Invention

For applications such as optical read-write memories, bar scanners, etc., a compact source of laser radiation in the visible (blue-green) part of the spectrum is required. The lasers available today which can meet the power requirement of greater than 5 mW or energy requirement of 50 microjoules are not available in packages smaller than 1 cubic inch.

There is therefore a need for an improved laser which will overcome the above limitations.

SUMMARY OF THE INVENTION

It is an object of the present invention to provide compact laser for use in the visible spectrum which can meet the applications power requirements and is compact, i.e., packagable within a one cubic inch volume.

The present invention is predicated on the realization that the art already contains most of the elements for achieving the above objects but has failed to realize the necessary integration and packaging configuration, provided herein.

The present invention begins with the selection of certain available components which are then integrated together in a unitary configuration having thermal communication with each other, as set forth. Conduction cooled laser diodes can emit 100 W of peak power from an area of 1 micron width and 1 cm length. A slab geometry can be used to capture the radiation along the 1 cm length, and, if the slab is positioned in close proximity of the laser diode, the pumped region will be of very small volume leading to high gain and efficiency without the use of space-consuming focusing optics. The laser material Nd—YVO$_4$ has very high absorption (approximately 13 per cm per wt. % of Nd) for diode radiation and slab lasers of thickness less than 1 mm can absorb 90% of the pump radiation by double passing through the slab which leads to high gain and efficiency. The slab geometry helps control thermal and gain concentration problems, while also providing a polarized output which optimizes the intracavity doubling step. A high intensity for intracavity doubling is obtained without using any additional optics due to the small mode size of the compact optical resonator disclosed.

Based on the above selections and the use of a uniquely designed thermal block or coupler, the present invention provides a very compact source of laser radiation in the visible which comprises a pulsed, solid-state laser diode; a slab laser comprising a slab of Nd—YVO$_4$; an optical cavity including frequency converter (a second harmonic, non-linear crystal, such as KTP), one surface of which doubles as the output coupler for the visible radiation; and one end laser mirror. All of these elements are thermally interconnected by being integrally mounted on a 25 mm long copper block. The front surface and case of the laser diode doubles in use as the conduction means to dissipate the heat generated in the slab laser back into the rest of the system. The slab laser is, itself, part of an assembly which includes an air-gap semiconductor heat transfer mechanism constructed in the manner described in my above-referenced copending application.

In a first embodiment, the block may be said to have arms for receiving the major elements, one arm for receiving the slab laser assembly and optics, and the other for receiving the pump laser diode. In a second embodiment, the laser slab and optics are integrated on a very small block assembly which attaches to the output face of the laser diode. Thermally, the embodiments work nearly the same but the latter embodiment is particularly compact and self contained.

The features of this design are ultra-compactness, freedom from alignment maintenance, laser cooling through the diode case or body itself, efficiency, and polarized output into a single transverse mode.

These and other features and objects of the invention will become apparent from the following detailed description and claims, when taken with the accompanying drawings, of which:

BRIEF DESCRIPTION OF THE DRAWINGS

FIG. 1 is a front elevational view, partly in cross section of a first embodiment of a slab laser constructed in accordance with the present invention.

FIG. 2 is a cross-sectional view taken along the lines 2—2 of FIG. 1.

FIG. 3 is a perspective view, with interior portions shown in phantom, of the embodiment of FIG. 1.

DESCRIPTION OF THE PREFERRED EMBODIMENTS

Figure 6:
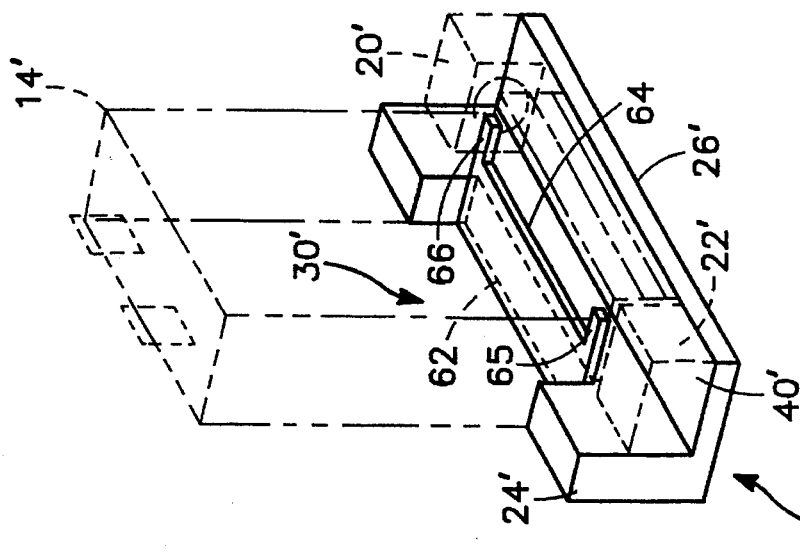
FIG. 6 is a perspective view, with interior portions shown in phantom, of the embodiment of FIG. 4.

Referring now to FIGS. 1-3, there is shown a first embodiment of a compact slab laser 10 constructed in accordance with the present invention and generally consists of a thermally conductive mounting block 12 to which are rigidly attached, in operative alignment: a solid-state pump laser diode 14 with electrical contacts 15, a slab laser assembly 16, and an optical cavity assembly 18 including a mirror 20 and a non-linear crystal 22.

The mounting block 12 forms the slab laser into a rigid unitary construction which is aligned on assembly and consists of a thermally conductive, monolithic rigid piece for mounting the components of said laser together in a unitary, integral structure. By way of example, the block 12 can be milled from a section of solid copper.

The block 12 generally includes a first arm 24 and a second arm 26 each extending through a junction or intersection 28 in common with the other. In this context the term "arm" is meant to generally include the structure shown and described herein for receiving and holding in place the elements recited and it need not be of any particular structure, configuration, or dimensions beyond that to carry out this function.

Arm 24 is provided with a back 29 immediately above and in leading into a recess 30 having upstanding side walls 32, 34 (FIG. 3) adjacent the intersection 28 for receiving and positioning the pump laser diode 14.

Arm 26 is provided with means forming a well 36 which lies below the end 14a of the laser diode 14 when the latter is in position in recess 30. The well 36 is defined by a back wall 38, a bottom wall 40 and a front wall 42 which serves to contact and position the slab laser assembly 16, mirror 20 and the non-linear crystal 22.

The portion of the body forming the intersection 28 provides a solid, one-piece interconnection between arm 24 and arm 26. The walls 38, 40, and 42, the junction at intersection 28, as well as the arm 24 are all machined from a single one-piece block of material, and are, therefore, not only rigid, but are thermally integral and common to each other, and will be placed into intimate thermal contact to provide a heat conduction path to laser diode 14 for cooling of the entire assembly 10.

The solid-state laser diode 14 is mounted in the recess 30 in arm 24 with thermally conductive adhesive between it and the back 29 and the walls 32 and 34 so that, by virtue of the afore-mentioned thermal arrangement, it also serves to dissipate the heat generated in the device.

The thermally conductive adhesive can be selected from the epoxy based adhesive system identified as Thermal Conductive Compound available from Tra-Con, Inc., (55 North St. Medford, Mass.) under the designation Tra-Bond 2151, having a thermal conductivity of 0.21 cal/m sec deg. C, and which cures at room temperature.

The pump laser diode 14 can be any of the commercially available, small conduction-cooled laser diodes and able to emit as much as 100 watts peak power from an area of about 1 micrometer in height and 1 cm in length. Higher power laser diode packages are also available and may be used herein which have stacks of these basic diode bar elements.

An example of a commercially available conduction-cooled laser diode is model SDL-3231-A1 diode sold by SDL Corporation which is rated at 60 W peak power and 1.2 W average power. The laser polarization for this laser is along the long dimension of the emitting region at end 14a which is assumed to be horizontal for purposes of this description.

The slab laser assembly 16 is mounted to the other arm 26 and, due to the slab geometry, is effective in capturing the radiation output from the end 14a of pump laser along its entire 1 cm of length. The slab laser assembly 16 is positioned in close proximity (typically 0.2 mm, for this example) to the end 14a of the laser diode, so that the pumped region will remain a very small volume leading to high gain and efficiency without the use of space-consuming focusing optics.

The internal construction and principle of thermal operation of the slab laser assembly 16 follows that disclosed in my copending application cross-referenced above. For a detailed description of its operation reference is made to that application.

The slab laser assembly 16 is shown best in FIG. 2 and includes a slab 44 of laser active material lying above and supported on a strip 46 of semiconductor wafer material (silicon or gallium arsenide) through which is cut a channel 47 forming a thin air gap (or other gas) with the slab. The slab 44 and strip 46 lie on a thin layer 48 of indium metal, which serves as a thermal bridge from the strip 46 to the block 12. The indium layer is not only an excellent thermal conductor, but also is ductile, showing creep deformation at very low stresses so that it yields under pressure to establish an excellent bond, both mechanical and thermal, between itself, the strip and the block The laser active material of slab 46 can be selected from a wide variety of available slab laser materials, one such, namely Nd-doped $YVO_4$ will be discussed herein by way of example. Nd-doped $YVO_4$ was selected because it has very high absorption (approximately 13 per cm per wt. % of Nd) for the diode radiation and slabs of thickness less than 1 mm can absorb 90% of the pump radiation on double passing leading to high gain and efficiency. A 1.7% Nd-doped $YVO_4$ slab to be fabricated for use in the present invention will have the following dimensions: 0.8 mm thickness, 4 mm width, 13.76 mm length, 25 degree slab angle with the c-axis along the thickness and a-axis along the length, as shown in FIG. 1.

By using the slab geometry, thermal and gain concentration problems are eliminated and a polarized output is obtained which also optimizes the intracavity doubling step, since, due to the small mode size of the compact resonator, a high intensity for intracavity doubling is obtained without using any additional optics.

The slab laser mounting means and the pump laser 14 are constructed and arranged so that the output of the pump laser is operatively and directly delivered into the slab laser to initiate lasing action therein as shown by the zig-zag path 50, as known in the art.

Heat is also generated and must be dissipated. To that end, heat conduction means established by this configuration for efficiently transferring heat into the block and consists of the air gap, the semiconductor heat sink, and indium layer, the construction and operation of which is similar to that described in my copending application.

Thus, the heat generated within the slab is conducted through the air gap 47 and strip 46 through the copper block 12, and thence through the diode 14 and into the device mounting structures (not shown). The maximum power dissipation of this particular device is estimated to be about 0.35 watts which is well below the heat removal capacity of this slab cooling geometry.

Means is provided forming the optical cavity mounted to block 12 in alignment with the slab laser assembly 16 for developing and doubling the laser beam output therefrom. The cavity comprises the mirror 20, and the nonlinear crystal 22 such as KTP with one surface acting as the second laser mirror. The crystal may be about 7 mm long. The laser cavity so defined has a 4 mm square cross section and 25 mm length and is mounted on copper block 12 which is shaped to the same dimensions. Thus the overall dimensions of the laser cavity is 8×8×25 mm for this example with a volume of 0.1 cubic inch.

The particulars of the optical cavity are as follows: Mirror 20 is aspheric having a 4 mm square cross section and 3.2 mm thickness and is placed on one side of the slab to act as the back mirror. Mirror 20 is HR (high reflection) coated for both 1064 nm and 532 nm and has a radius of curvature in the horizontal plane (parallel to the c-axis of the crystal, FIG. 1) of 2 m, and a radius of curvature in the vertical plane (orthogonal to both the a-axis and the c-axis) of 0.05 meters. The radii of curvature are determined such that the lowest order resonator mode overlaps with the pumping region.

Typically the laser mode size in air is chosen to be less than 125 microns in the vertical direction and less than 300 microns in the horizontal direction.

The crystal 22 is 7 mm long and 4 mm square and cut to phase match the 1064–532 nm conversion for horizontally polarized light. Both surfaces of the KTP crystal are flat and laser polished, both surfaces are AR (anti-reflection) coated for 532 nm, the surface facing the slab is AR coated for 1064 nm, the surface forming the resonator output coupler being HR coated for 1064 nm.

The 1064 nm radiation generated in the Nd—YVO$_4$ slab, is reflected by the end curved mirror, is amplified in the slab, and then converted to 532 nm radiation in the KTP crystal 22 which serves as an internal non-linear optical element to convert the output laser wavelengths to 532 nm in the green, for this particular case, or to other wavelengths, using a different non-linear optical configuration known as optical parametric oscillation. It is then reflected by the other surface of the KTP crystal which is polished flat and which is highly reflecting for the 1064 nm radiation. The 532 nm radiation passes through the same surface unattenuated due to the antireflection coating at 532 nm. The laser parameters are optimized such that, despite the compact geometry, a high intracavity intensity is generated for efficient nonlinear optical conversion. Without these optimizations, the laser would not be useful for applications requiring visible or tunable infrared radiation.

The cavity is aligned in a separate alignment fixture by pumping with an external laser diode source (not shown), and once the alignment is correct, the components are rigidly fixed on the copper block using non-degrading thermally conductive adhesive, as above described. For example, a thin layer of adhesive is applied to the inside walls 28 and 42 and the slab is pressed against the silicon 46, which in turn is pressed against the inside wall of 36 through a thin and compressible layer of indium 48. The interface between the indium layer and its adjacent surfaces are pressed together sufficiently to cause the indium to undergo creep deformation under stress and to fill the surface interstices of the adjacent material of the strip and of the copper block, and so do not require the use of a separate adhesive material because of the adherent nature of the deformed indium metal. The thermal conductivity of indium metal is high, so that it forms an excellent thermal conduction path from the strip to the copper block.

The laser diode is then integrated with the assembled slab laser module (ISL) in a final step, by placing the diode fully down into the recess 30 and using means such as using thermally conductive adhesive between it and the side walls 32 and 34 to hold it permanently in place.

The laser diode radiation falls symmetrically along the length of the slab. The distance between the slab upper surface and the diode emitting aperture is typically 125–150 microns. The high index of the laser medium confines the diode radiation to a small gain volume which is approximately 0.1×0.8×10 mm in this example.

The alignment and performance of the laser does not depend, to first order, on the alignment of the laser mount with respect to the diode block.

Figure 5:
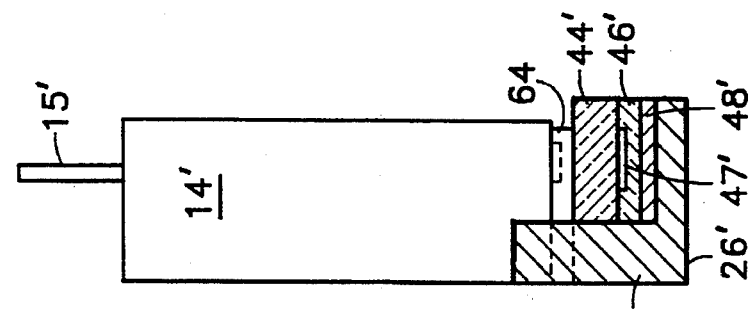
FIG. 5 is a cross-sectional view taken along the lines 5—5 of FIG. 4.
Figure 4:
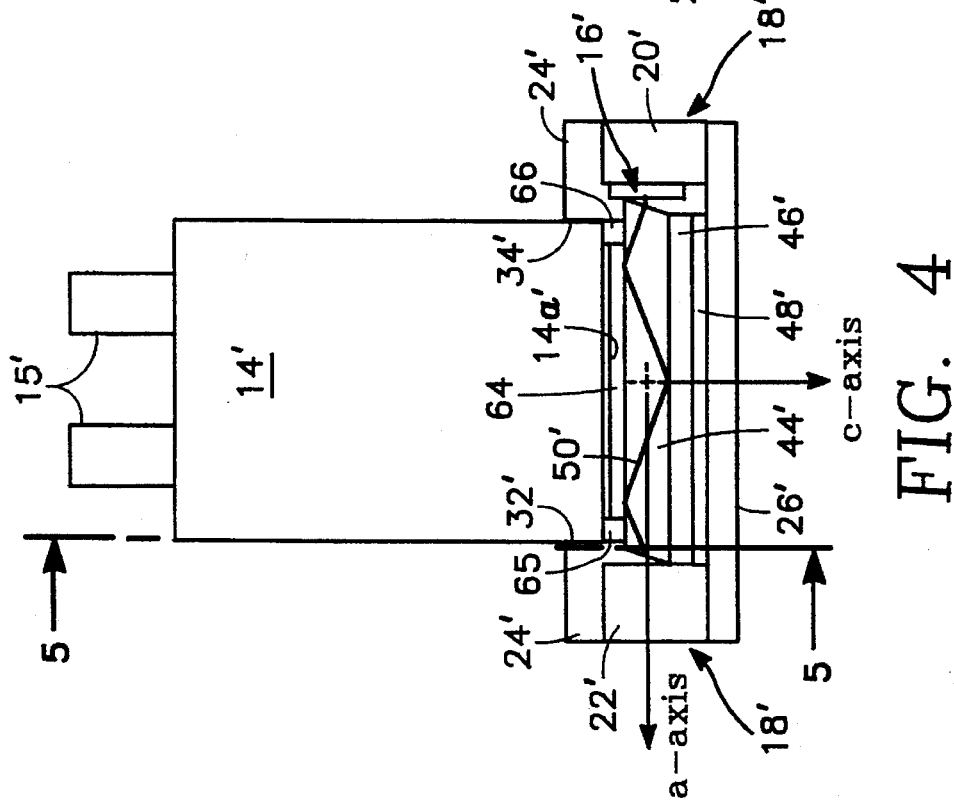
FIG. 4 is a front elevational view, partly in cross section of a second embodiment of a slab laser constructed in accordance with the present invention.

Referring now to FIGS. 4–6, there is shown an alternate embodiment of the invention which is similar to that of FIGS. 1–3 in most respects so that like parts have been given like numbers raised by a prime ('). Where the function is substantially the same as the first embodiment further discussion and explanation is unnecessary. The block 60, however, is now designed to enable the slab laser assembly and optics to be placed over the end of the diode laser and to be supported on it in the manner of an end cap. Thus, while block 60 has a recess 30' with side walls 32', 34', it is further provided with a flat spacer 64 extending across the floor 62 of the recess 30', from which spacer extend a pair of forward projections 65, 66 (FIGS. 4 and 6). These projections lie between the bottom face of the laser diode 14' and the slab upper face to establish a predetermined parallel and uniform gap in accordance with the design. Additional, when being assembled, the gap between the spacer projections 64, 66 and the bottom or floor 40' of arm 26' is made equal to the depth of the slab laser assembly 16' by downward pressure from the front face of diode 14'. This pressure, also deforms the indium layer slightly to give the assembly 16' good thermal contact to the block 60.

Thus, a very compact source of laser radiation in the visible has been described which uses pulsed laser diode on which is mounted a laser cavity comprising of a slab of Nd—YVO$_4$, a second harmonic crystal such as KTP, one surface of which becomes the output coupler of the visible radiation, and one end mirror. The features of this design are ultra-compactness, alignment maintenance, laser cooling through the diode block itself, efficiency, and polarized output into a single transverse mode. The harmonic generation crystal may be replaced with an optical parametric device for tunable radiation in other parts of the spectrum.

To those skilled in the art to which this invention pertains, many improvements will occur such as the use of other materials and operating parameters, as well the changing of the propagation path through the slab. Other wavelengths may be accessed using different nonlinear material configuration such as an optical parametric oscillator instead of a doubler. Other pulsewidths and pulse patterns of the emitted radiation may be obtained using direct modulation of diode current or by electro- or acousto-optically induced changes in the nonlinear material. The laser medium may be replaced with materials such as Nd—YAB which by itself produces the second harmonic. Further, the harmonic generation crystal may be replaced with an optical parametric device to provide for tunable output in other parts of the spectrum in the near UV to the infrared.

What is claimed is:

1. A slab laser of unitary construction, comprising:

means forming a thermally conductive, rigid, block assembly for mounting the components of said laser together in a unitary, integral structure, said block generally including first and second arms extending through a thermally conductive intersection with respect to each other, a pump laser diode mounted into one arm, a slab laser assembly mounted into the other arm, said slab laser assembly and said pump laser diode being constructed and arranged so that, when positioned and held in operative alignment by the block, the output of the pump laser diode is operatively directed into the slab laser assembly to initiate lasing action therein and heat, said slab laser assembly further including a slab laser crystal and heat conduction means for efficiently transferring said heat from said slab laser crystal into said one arm for conduction through said intersection of said block to the other arm and the diode, and means forming an optical cavity mounted to said block and aligned thereon with said slab laser crystal for developing a laser beam output therefrom at a frequency of interest.

2. The slab laser as in claim 1 further in which said optical cavity is provided with an internal non-linear optical element to convert the output laser wavelengths to a frequency of interest.

3. The slab laser as in claim 2 further in which said laser pump diode operates at 1064 nm, and said non-linear element converts said pump radiation to 532 nm in the green by non-linear optical frequency conversion.

4. The slab laser of claim i further in which said means forming an optical cavity includes an aspheric mirror.

5. A slab laser of unitary construction, comprising:

a thermally conductive, rigid, one-piece block for mounting the components of said laser together in a unitary, rigid integral structure, said block generally including first and second arms extending through a thermally conductive intersection with respect to each other, a pump laser diode mounted into one arm, a slab laser assembly mounted into the other arm, said slab laser assembly and said pump laser diode being constructed and arranged so that the output of the pump laser diode is operatively directed into the slab laser assembly to initiate lasing action therein and heat, said slab laser assembly further including heat conduction means for efficiently transferring said heat into said arm for dissipating through said intersection of said block, and means forming an optical cavity mounted to said block and aligned thereon with said slab laser for developing a laser beam output therefrom at a frequency of interest.

6. The slab laser as in claim 5 further in which said optical cavity is provided with an internal non-linear optical element to convert the output laser wavelengths to a frequency of interest.

7. The slab laser as in claim 6 further in which said laser pump diode operates at 1064 nm, and said non-linear element converts said pump radiation to 532 nm in the green by non-linear optical frequency conversion.

* * * * *